United States Patent
Wendelrup

(10) Patent No.: US 7,698,302 B2
(45) Date of Patent: Apr. 13, 2010

(54) MOBILE PHONE CONTENT-BASED RECOMMENDATION OF NEW MEDIA

(75) Inventor: Heino Wendelrup, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 378 days.

(21) Appl. No.: 11/553,562

(22) Filed: Oct. 27, 2006

(65) Prior Publication Data

US 2008/0091722 A1    Apr. 17, 2008

Related U.S. Application Data

(60) Provisional application No. 60/829,352, filed on Oct. 13, 2006.

(51) Int. Cl.
*G06F 17/30* (2006.01)

(52) U.S. Cl. ............. 707/104.1; 707/913; 707/E17.009

(58) Field of Classification Search ............. 707/104.1, 707/102; 345/530, 553
See application file for complete search history.

(56) References Cited

U.S. PATENT DOCUMENTS

| | | | |
|---|---|---|---|
| 6,005,597 A | | 12/1999 | Barrett et al. |
| 6,438,579 B1 * | | 8/2002 | Hosken ............. 709/203 |
| 2003/0061206 A1 | | 3/2003 | Qian |
| 2003/0093790 A1 | | 5/2003 | Logan et al. |
| 2004/0044677 A1 | | 3/2004 | Huper-Graff et al. |
| 2004/0268390 A1 | | 12/2004 | Sezan et al. |
| 2005/0060350 A1 * | | 3/2005 | Baum et al. ........... 707/104.1 |
| 2005/0066350 A1 | | 3/2005 | Meuleman |
| 2005/0278758 A1 * | | 12/2005 | Bodlaender ........... 725/89 |
| 2006/0195521 A1 * | | 8/2006 | New et al. ........... 709/204 |
| 2007/0156589 A1 * | | 7/2007 | Zimler et al. ........... 705/51 |
| 2007/0220552 A1 * | | 9/2007 | Juster et al. ........... 725/46 |
| 2008/0059422 A1 * | | 3/2008 | Tenni et al. ........... 707/3 |
| 2008/0092170 A1 * | | 4/2008 | Shannon et al. ........... 725/46 |

FOREIGN PATENT DOCUMENTS

| | | |
|---|---|---|
| WO | WO 01/47273 | 6/2001 |
| WO | 03/007261 | 1/2003 |
| WO | WO 03/071791 | 8/2003 |
| WO | 2004/063920 | 7/2004 |

OTHER PUBLICATIONS

Bakos et al., "Search Engine for Phonebook-based Smart Phone Networks", Vehicular Technology Conference, IEEE, 2005, pp. 2795-2799.

Coyle et al., "Supplementing Case-based Recommenders with Context Data", School of Computer Science & Informatics, 2006.

* cited by examiner

*Primary Examiner*—Cheryl Lewis
(74) *Attorney, Agent, or Firm*—Renner, Otto, Boisselle & Sklar, LLP

(57) ABSTRACT

A method of recommending new media to a user based on various information stored and/or collected by, for example, a mobile phone is provided. More particularly, the invention provides a method of recommending new media based on information such as, for example, the content of sent and received text messages, previously viewed sound and/or video clips, location, content of emails, environmental information such as temperature or pressure, etc. Accordingly, the invention facilitates the use of information generated by a user during use of a mobile phone for recommending media to the user.

14 Claims, 4 Drawing Sheets

MOBILE PHONE CONTENT-BASED RECOMMENDATION OF NEW MEDIA

RELATED APPLICATIONS

This application claims the benefit of U.S. Provisional Application No. 60/829,352 filed Oct. 13, 2006, which is hereby incorporated herein by reference.

TECHNICAL FIELD OF THE INVENTION

The present invention relates generally to electronic equipment and, more particularly, to electronic equipment and a method of recommending new media based on data collected by the electronic equipment.

DESCRIPTION OF THE RELATED ART

Conventional mobile phones, in addition to providing voice communication capabilities, also provide a number of non-voice related features. For example, mobile phones can be used to "surf" the internet, transmit and receive messages (e.g., emails and text messages (SMS)), play music and videos, watch television programming, take and display photographs, track location using GPS (or other means), as well as a number of other features. Many mobile phones include other tools such as calendars, alarm clocks, notepads, etc. Some phones also include a keyboard and a CPU that gives the phone personal computer-like functionality.

As a result of the increased functionality of mobile phones, users are becoming more and more reliant on such devices. Indeed, for many people a mobile phone is an essential part of their everyday life. For example, in a given day a phone alarm clock may wake a user in the morning and the phone calendar may remind the user of various tasks to be performed during the day. The user may then use the phone to place calls throughout the day to work associates and family members. Various text messages may be sent between the user and various acquaintances of the user. Throughout the course of the day the user may use the mobile phone to read and/or respond to numerous emails. In the evening, the phone might be used to take a picture or video of an interesting event that the user experiences. Typical phones include logs that record most if not all of such phone activity.

As mobile phones become increasingly multimedia oriented and the amount of new media, such as videos, music, television etc., generated for such devices grows, accessing relevant new media can be a challenge to the user. Currently, to find new media a user typically must navigate one or more menus or screens in order to locate and play new media. In addition, the vast majority of newly generated media is not relevant to any given user and, moreover, the amount of time a given user has to locate and consume new media may be short. Accordingly, locating relevant new media in a quick and efficient manner is desirable.

In the past, there have been attempts at recommending media in relation to recommending television programs and/or movies to a user based on user preferences. For example, U.S. Pat. No. 6,005,597 discloses a system for program selection. Viewing preferences of a viewer are used to create a dynamic viewer profile, which is used automatically to rate programs available for watching. The available programs are presented to the user in descending order of predicted interest in the form of on-screen menus or preview windows on the screen. The system in U.S. Pat. No. 6,005,597 obtains data about titles and topics of available TV programs from web sites that list topics and descriptive information about programs. The system monitors a viewer's habits and builds an evolving model of the viewer's preferences such as the name of the program, the topic area, the time watched, etc. The evolving model is used to determine other programs that would be of interest to the user.

SUMMARY

The present invention allows media to be recommended to a user based on a wide variety of information generated by a user during a given time period. For example, a method of recommending new media to a user based on various information stored and/or collected by, for example, a mobile phone is provided. More particularly, the invention provides a method of recommending new media based on information such as, for example, the content of sent and received text messages, previously viewed sound and/or video clips, location, content of emails, environmental information such as temperature or pressure, etc. Accordingly, the invention facilitates the use of information generated by a user during use of a mobile phone for recommending media to the user.

According to one aspect of the invention, there is provided a method of recommending media to a user of an electronic equipment based upon information available from the electronic equipment comprising accessing a memory of the electronic equipment, the memory including data related to the operation of the electronic equipment, analyzing at least the data related to operation of the electronic equipment to determine characteristics thereof, and generating a list of recommended media based on the characteristics of the data.

According to another aspect of the invention, the method further comprises searching the internet for media related to the determined characteristics.

According to another aspect of the invention, accessing the memory includes accessing at least one of call log data, message log data, video/picture log data, MP3 log data, location log data, environmental log data, calendar log data, and voice memo log data.

According to another aspect of the invention, the method further comprises searching a media provider for media related to the determined characteristics.

According to another aspect of the invention, accessing the memory includes accessing location log data and the generating includes generating a list of recommended media including geographically specific media whereby media relating to a user's location at a given time is recommended.

According to another aspect of the invention, the list of recommended media includes advertisements.

According to another aspect of the invention, the geographically specific media is an advertisement.

According to another aspect of the invention, the accessing includes accessing environment log data related and wherein the generating a list of recommended media including media relating to a user's environment at a given time is recommended.

According to another aspect of the invention, the characteristics determined by the analyzer correspond to attributes of available media.

According to another aspect of the invention, the method further comprises comparing the determined characteristics to a predetermined list of characteristics.

According to another aspect of the invention, the method further comprises comparing the list of recommended media to an exclude list, and removing media from the recommended media list that appears on the exclude list.

According to another aspect of the invention, wherein the analyzing is performed by a second separate electronic equipment.

According to another aspect of the invention, the second separate electronic equipment is a server in communication with the electronic equipment.

According to another aspect of the invention, an electronic equipment comprises a memory for storing at least data corresponding to operation of the electronic equipment, a media analyzer for analyzing the data corresponding to operation of the electronic equipment and determining characteristic of the data, and a processor for accessing the internet to search for media based on the characteristics determined by the media analyzer.

According to another aspect of the invention, the at least one type of user data includes call log data, message log data, video/picture log data, MP3 log data, location log data, environmental log data, calendar log data, voice memo log data, and media data.

According to another aspect of the invention, the electronic equipment is a mobile phone.

According to another aspect of the invention, electronic equipment is at least one of a personal audio device, a personal video device or a personal digital assistant.

According to another aspect of the invention, a computer program embodied in a computer readable medium for recommending media to a user of an electronic equipment based upon information available from the electronic equipment comprises code that accesses a memory of the electronic equipment, the memory including data related to the operation of the electronic equipment, code that analyzes at least the data related to operation of the electronic equipment to determine characteristics thereof, and code that generates a list of recommended media based on the characteristics of the data.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of the given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
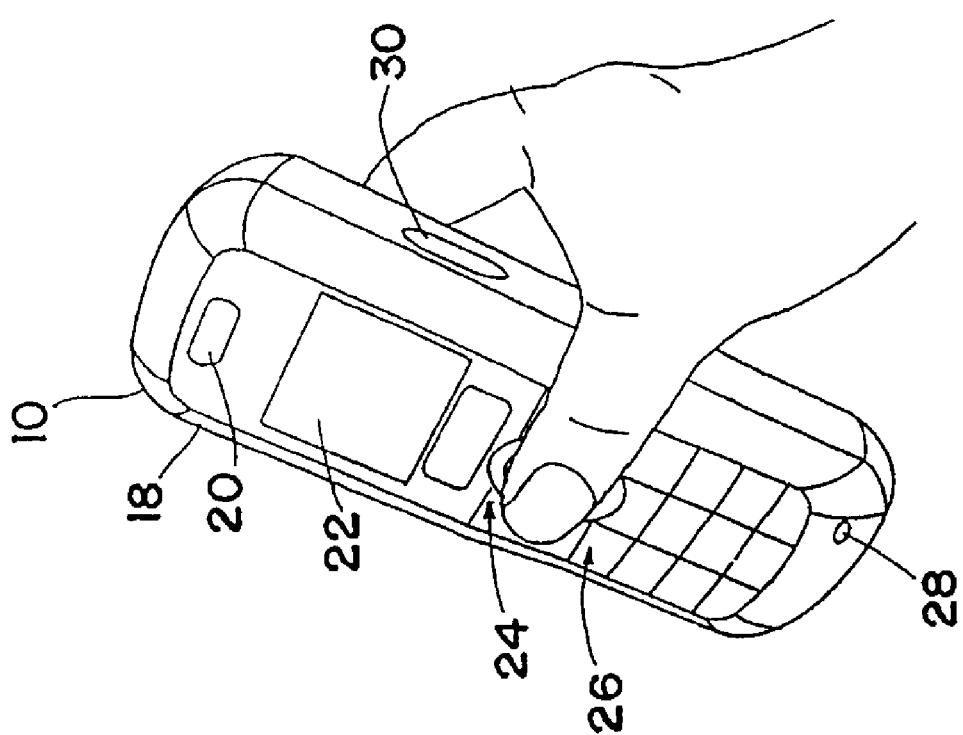
FIG. 1 is an illustration of an exemplary mobile phone.

The present invention will now be described with reference to the drawings, wherein like reference numerals are used to refer to like elements throughout.

The term "electronic equipment" includes portable radio communication equipment. The term "portable radio communication equipment," which hereinafter is referred to as a "mobile radio terminal," "mobile phone", "mobile device", or "mobile terminal" and the like, includes all equipment such as mobile telephones, pagers, communicators, i.e., electronic organizers, personal digital assistants (PDAs), smartphones, portable communication apparatus or the like. The term "electronic equipment" also may include portable digital music and/or video devices, e.g., iPod devices, mp3 players, etc.

In the present application, the invention is described primarily in the context of a mobile phone. However, it will be appreciated that the invention is not intended to be limited to a mobile phone and can be any type of electronic equipment.

Referring now to FIG. 1, a mobile phone 10 is shown as having a "brick" or "block" design type housing 18 (sometimes referred to as a case), but it will be appreciated that other type housings, such as, for example, clam shell or slide-type housings, may be utilized without departing from the scope of the invention. The mobile phone 10 further includes a speaker 20, display 22, a navigation switch or switches 24, a key pad 26, a microphone 28, and a side switch 30; these are illustrative and exemplary of parts of a typical mobile phone, but it will be appreciated that other parts that are similar or different in form and/or function may be included in the mobile phone 10. The mobile phones to which the invention pertains also may be of the types that have more or fewer functions, keys, etc., compared to those illustrated and described herein.

As will be appreciated, the mobile phone 10 may function as a conventional mobile phone. The mobile phone 10 may have additional functions and capabilities that may be developed in the future. From a conventional point of view, the display 22 displays information to a user, such as operating state, time, phone numbers, contact information, various navigational menus, etc., which facilitate and/or enable the user to utilize the various features of the mobile phone. The display also may be used to view movies, images, or to play games, for example. Part or all of the display 22 may be a touch screen type device. The navigation and function keys 24 and the keypad 26 may be conventional in that they provide for a variety of user operations. For example, one or more of the function keys and navigation switch or switches 24 may be used to navigate through a menu displayed on the display 22 to select different phone functions, profiles, settings, etc., as is conventional. The keypad 26 typically includes one or more special function keys, such as, a "call send" key for initiating or answering a call, a "call end" key for ending or hanging up a call, and dialing keys for dialing a telephone number. Other keys included in the navigation switch or switches 24 and/or keypad 26 may include an on/off power key, a web browser launch key, a camera key, a voice mail key, a calendar key, etc. The side switch 30 can be configured to perform any of a wide variety of functions.

Figure 2:
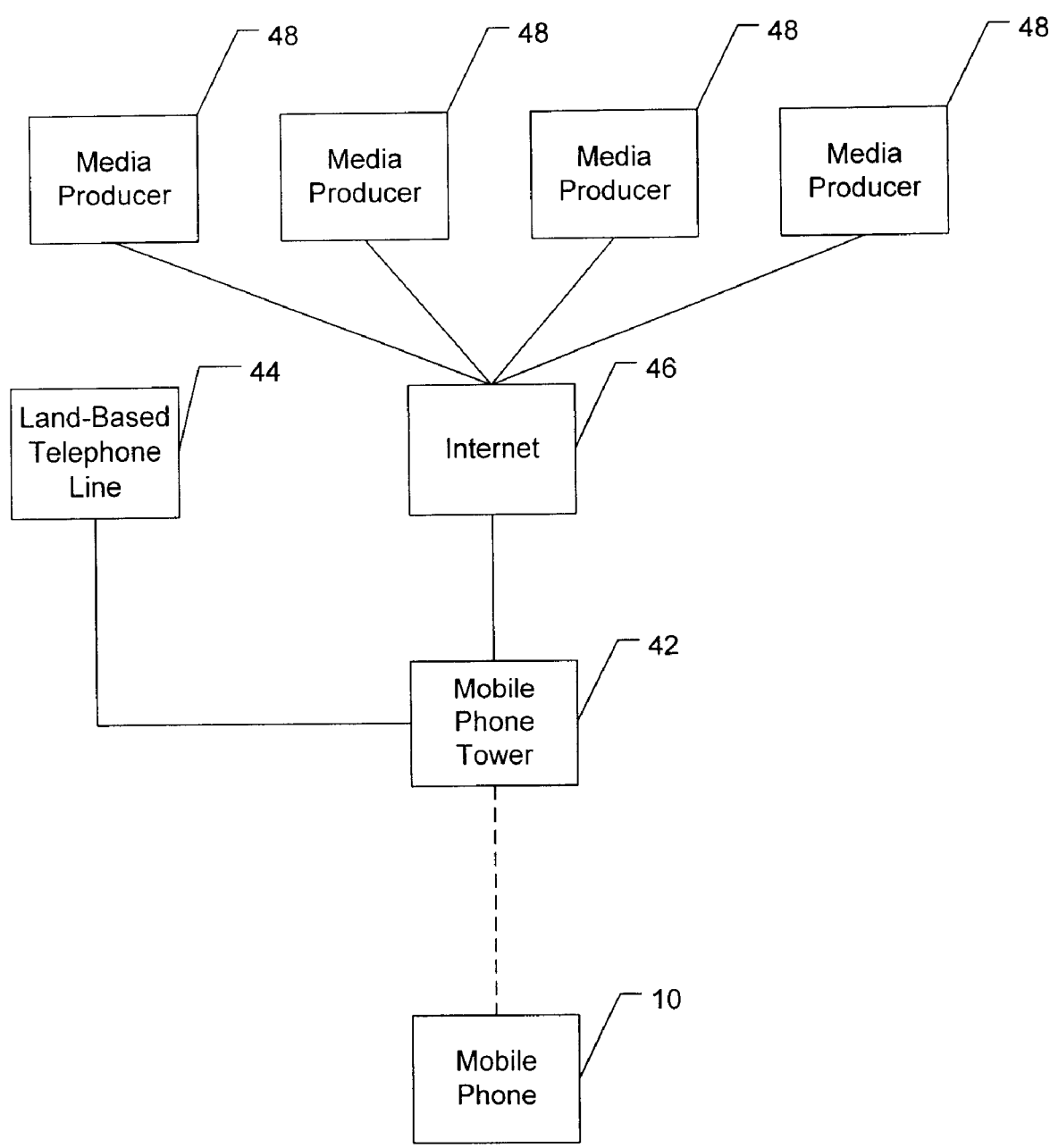
FIG. 2 is a schematic illustration of a typical mobile phone network that can be used to retrieve media from the internet.

Turning to FIG. 2, a typical mobile phone network 40 is illustrated including the mobile phone 10. The network includes at least one mobile phone (cell) tower 42 to which the phone 10 can communicate wirelessly for sending and receiving voice calls and data transmissions. The mobile phone tower 42 is connected to at least one land-based telephone line 44 for servicing voice calls. The mobile tower 42 is also connected to the internet 46 for servicing data transmissions. A plurality of media producers 48 generate content that is available for transfer to the phone 10 via the internet 44. It will be appreciated that the configuration of the network 40 in FIG. 2 is merely exemplary in nature and that aspects of the invention are applicable to a wide variety of network types and configurations. For example, instead of connecting to the internet 46, the mobile tower 42 could connect to an intranet to which the media producers 48 supply content.

Figure 3:
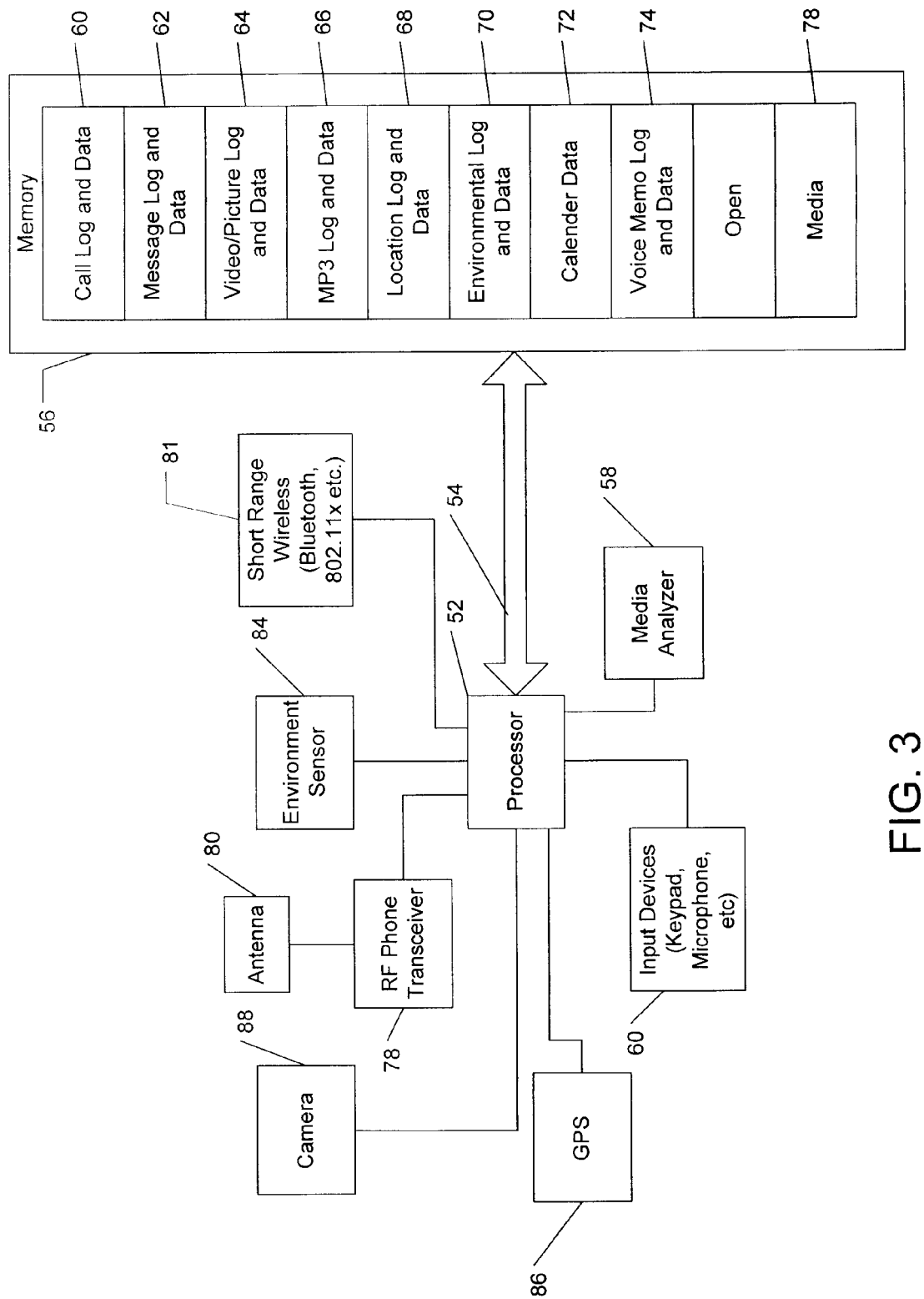
FIG. 3 is a schematic illustration of components of an exemplary mobile phone.

Referring now to FIG. 3, a schematic diagram illustrates some exemplary components of the mobile phone 10. For the sake of clarity, some components of a typical mobile phone have been omitted. The mobile phone 10 includes a processor 52, which can be any type of processor typically associated with mobile phones and/or handheld devices. The processor 52 is coupled via a bus 54 to a memory 56 that stores a variety of data that is used by a media analyzer 58 to generate media recommendations, as will be described. It will be appreciated that data can be stored in other additional memory banks (not illustrated) and that the memory banks can be of any suitable type, such as read-only memory, read-write memory, etc. The logs stored in the memory 56 can include information such as, for example, the time of the stored event, the number or person to whom or from whom a call or message is sent or received, the content of text messages and/or emails, image and/or video data, temperature and/or elevation data, voice memo audio files, etc.

For example, a call log 60 is provided containing the date, time, and number of calls placed, received, and missed. A message log 62 is provided containing recipient sender information, date/time information, and the content of the text and or email messages sent and received by the phone 10. A video/picture log 64 includes information such as the date and time a picture/video was taken. An MP3 log 66 includes information regarding the MP3's listened to by a user including the date and time each MP3 was played. A location log 68 includes location information data. An environmental log 70 can include information gathered from one or more environmental sensors, such as the temperature at a given date/time. Calendar data log 72 includes information regarding appointments and events. A voice memo log 74 includes data regarding voice memos including the date/time of each. Various types of media 78, such as MP3s and video clips, are also stored in the memory 56. It will be appreciated that a wide variety of other types of data can be stored in the memory 56 as desired, and the types of data illustrated are merely exemplary.

The processor 52 is also connected to an RF phone transceiver 78 and antenna 80 for sending and receiving voice calls and data. A short range wireless transceiver 81 is provided for establishing a connection with other wireless devices. The wireless transceiver 81 can be a Bluetooth or 802.11x transceiver, for example. A plurality of other devices can be connected to the processor 52 for collecting and/or producing data that can be stored in the memory 56. For example, an input device 82, which can be the keypad 26, for example, is connected to the processor for inputting data from the user. In the case of the keypad 26, the inputted data can be alphanumeric characters. Other input devices, such as a microphone, also can be provided. An environment sensor 84, which may be a thermometer or a barometer, for example, can be used to collect information about the local environment. A GPS unit 86 can be provided for collecting information about the location of the cell phone. A camera 88 can be provided for taking pictures and/or video. As will be appreciated, other devices can be provided for generating data. The configuration of the processor 52, related devices, and memory 56 is not germane to the invention, and any arrangement or combination of such components can be used in accordance with the invention.

Figure 4:
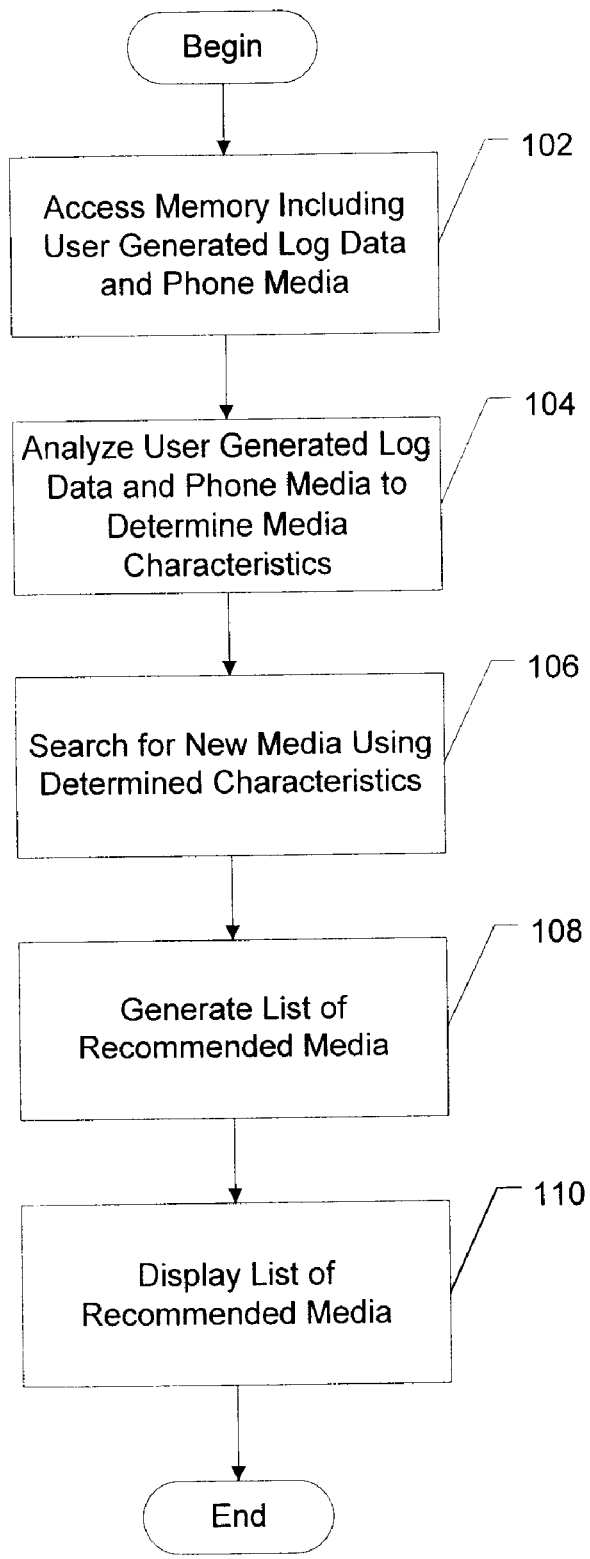
FIG. 4 is a flowchart illustrating an exemplary method in accordance with the invention.

Referring to FIG. 4, and in accordance with an aspect of the invention, an exemplary method of recommending media is illustrated. The method begins with process step 102 wherein the media analyzer 58 accesses memory 56. In process step 104, the media analyzer 58 analyzes the media and log data stored in memory 56 to determine characteristics of the media/log data. The media analyzer, for example, determines characteristics of the media/log data including type of media, artist or author, subject, genre, play frequency, etc. The analyzer can also analyze the content of messages for keywords. For example, if a text message includes the term "baseball", the analyzer can recognize the term and be configured to assign a baseball characteristic to the text message.

In process step 106, the media analyzer provides a list of the determined characteristics to the processor 52, which connects to the internet or directly to a media provider (e.g., via RF transceiver 78, Bluetooth, or the like) and searches for new media using the determined characteristics. By way of example, consider that the analyzer determines the following characteristics in process step 104: baseball, rolling stones, rock and roll, Ferrari. Accordingly, in process step 106 the internet and/or media provider is searched for these characteristics. The characteristics can be entered singly or as a group into a search engine (e.g., Google, Yahoo, etc.), for example. The characteristics can be compared, prior to searching, to a predefined list of user-approved characteristics so that only media corresponding to characteristics that the user has approved is returned. Accordingly, in the example above (characteristics baseball, rolling stones, rock and roll, Ferrari) if the user has indicated that no media relating to cars is desired, the characteristic Ferrari will not be searched. As will be appreciated, the user can define virtually any rule to be applied to process step 106 thereby allowing the user to customize media recommendations.

Once the media search results are returned, a list of recommended media is generated in process step 108. In some cases, all of the search results are included in the list of recommended media. In other instances, however, the search results can be compared to user defined criteria to determine which search results are included in the generated list. A parental control, for example, is a user defined criteria that the search results may be compared to so as to ensure that no obscene media is included in the recommended media list. Similarly, the list of recommended media can be compared to an ignore list to exclude any particular media. By way of example, an ignore list indicating media related to the Cleveland Indians baseball team should be ignored would result in the exclusion of all Indians related media from the recommended list, regardless of the fact that baseball is an included characteristic in the search.

Once the recommended media list is generated in process step 108, the list of recommended media is then displayed to the user in process step 110, at which point the user can decide whether to access the recommended media.

The generated list of recommended media can include a wide variety of media types, for example, movies, pictures, music, games, ringers, etc. By way of example, a typical list of recommended media may include a plurality of news clips, sports clips, music videos, advertisements, media relating to local information such as traffic reports and weather, advertisements for establishments and services within a geographical area associated with the location of the phone, music audio files for downloading, etc.

It will be appreciated that media often includes a metadata corresponding to attributes of the media. An attribute can be any characteristic or descriptive term relating to the media (e.g., metadata). For example, in the case of an audio music file, an attribute can be an artist name, music genre, song name, etc. Attributes of a video can include keywords related to the content of the video such as geographical identifying information, topic, etc. It will be appreciated that the analyzer can be configured to recognize characteristics of the data analyzed relating to such attributes to facilitate searching.

Accordingly, it will be appreciated that any and all information stored in a memory of a mobile phone can be used to determine media to recommend to a user. For example, if the information stored in the memory of a mobile phone includes information about recently played audio files, the analyzer can determine the characteristics of the recently played audio files and search for related media to recommend to the user.

As another example, if the information stored in the memory includes information regarding the location of the user, the analyzer can recognize such locations and search for geographically specific media. Accordingly, as a user travels to a new geographical location, media relating to the user's geographical location can be recommended. For example, media regarding top restaurants in a city can be recommended to a user. Similarly, information regarding a city's sports teams, news, traffic, etc. can be recommended to a user when it is determined that the user is in particular geographical area. In some instances, it may be desirable to recommend geographically specific media to a user for a limited time corresponding to, for example, the first few hours that a user is determined to be within a geographical region. Thus, when a user travels to a new location, geographically specific media can be recommended to the user initially, but as time goes on the recommended media returns to less geographical specific media. Similarly, if the user is in a geographical location for a first time, certain media for first time visitors can be recommended, such as a welcome video highlighting a city near the geographical location.

Media also can be recommended to a user as the user travels. For example, if the user is in a vehicle traveling from point A to point B, media can be recommended to the user relating to the history of the geographical locations through which the user travels, points of interest, natural wonders, etc. Such media recommendations can be continually updated as the user travels thereby providing the user with fresh content relating to the area in which the user is traveling.

In accordance with another aspect of the invention, advertisements can be recommended to a user. Thus, as a user enters a geographical area in which one or more businesses are located, advertisements for such businesses can be recommended to the user. The user can specify the type of businesses that are desired, such as restaurants, bars, etc. The advertisements can be generated by the individual businesses and stored for retrieval by the user if so desired. In this manner, targeted advertising can be delivered to a user of a mobile phone within a certain range of a business, for example. It will be appreciated that advertisements relating to a wide variety of products and services can be recommended to a user, and such advertisements need not be limited to products and services in a particular geographical area.

Environmental data can also be used to recommend media to a user. For example, temperature and/or barometric pressure and the like can be used to recommend media to a user. For example, if the temperature exceeds a certain amount and the barometric pressure is relatively high such as when the weather is typically fair and hot, media containing a surf report or boating forecast can be recommended. Similarly, if a low temperature is detected, media related to skiing or winter activities can be recommended.

It will be appreciated that user preferences can control the types of media recommended. For example, a user can specify that only media relating to music is recommended. Similarly, a user can specify that only certain types of generated data be included in the list representing generated data that is accessed to generated recommended media.

It will be appreciated that aspects of the invention can be applied to recommend a wide variety of media based upon a wide variety of generated information. Generated information includes any and all data generated during use of an electronic equipment. By basing recommendations of media on the generated data content stored in a memory of a phone, the invention can provide media recommendations based on a wider variety previously unused information.

It will further be appreciated that the methods set forth herein can be carried out by suitable software, for instance, a program stored on a computer-readable or machine-readable medium. Further, some of the process steps of the methods set forth herein can be performed by a separate electronic device, such as a server to which the phone connects. For example, the phone can connect to a server and provide user information to the server. The server can then analyze the information and develop recommendations in the manner described herein. The recommended media can then be sent to the phone and displayed to the user.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of recommending media to a user of an electronic equipment based upon information available from the electronic equipment comprising:
    accessing a memory of the electronic equipment, the memory including data related to the operation of the electronic equipment;
    analyzing at least the data related to operation of the electronic equipment to determine characteristics thereof;
    generating a list of recommended media based on the characteristics of the data; and
    displaying the list of recommended media to the user on a display of the electronic equipment;
    wherein the determined characteristics correspond to attributes of available media; and
    wherein the accessing the memory includes accessing at least one of call log data, message log data, video/picture log data, environmental log data, calendar log data, and voice memo log data.

2. A method as set forth in claim 1, further comprising searching the internet for media related to the determined characteristics.

3. A method as set forth in claim 1, further comprising searching a media provider for media related to the determined characteristics.

4. A method as set forth in claim 1, wherein the media includes an advertisement.

5. A method as set forth in claim 1, wherein the accessing includes accessing environment log data and wherein the generating a list of recommended media includes media relating to a user's environment at a given time.

6. A method as set forth in claim 1, wherein the list of recommended media includes advertisements.

7. A method as set forth in claim 1, further comprising comparing the determined characteristics to a predetermined list of characteristics.

8. A method as set forth in claim 1, further comprising comparing the list of recommended media to an exclude list, and removing media from the recommended media list that appears on the exclude list.

9. A method as set forth in claim 1, wherein the analyzing is performed by a second separate electronic equipment.

10. A method as set forth in claim 9, wherein the second separate electronic equipment is a server in communication with the electronic equipment.

11. An electronic equipment comprising:
    a memory for storing at least data corresponding to operation of the electronic equipment;
    a media analyzer for analyzing the data corresponding to operation of the electronic equipment and determining characteristic of the data;
    a processor for accessing the internet to search for media based on the characteristics determined by the media analyzer; and
    a display for displaying a list of recommended media;
    wherein the characteristics determined by the analyzer correspond to attributes of available media;
    wherein the data corresponding to operation of the electronic equipment includes at least one of call log data, message log data, video/picture log data, environmental log data, calendar log data, and voice memo log data.

12. An electronic equipment as set forth in claim 11, wherein the electronic equipment is a mobile phone.

13. An electronic equipment as set forth in claim 11, wherein the electronic equipment is at least one of a personal audio device, a personal video device or a personal digital assistant.

14. A computer program embodied in a computer readable medium for recommending media to a user of an electronic equipment based upon information available from the electronic equipment comprising:
    code that accesses a memory of the electronic equipment, the memory including data related to the operation of the electronic equipment;
    code that analyzes at least the data related to operation of the electronic equipment to determine characteristics thereof;
    code that generates a list of recommended media based on the characteristics of the data; and
    code that displays the list of recommended media to the user on a display of the electronic device;
    wherein the characteristics determined by the code that analyzes correspond to attributes of available media; and
    wherein the data related to the operation of the electronic equipment includes at least one of call log data, message log data, video/picture log data, environmental log data, calendar log data, voice memo log data, and media data.

* * * * *